United States Patent [19]
Dyke

[11] 4,136,704
[45] Jan. 30, 1979

[54] ROTOR FOR A COMBINE
[75] Inventor: Calvin J. Dyke, Mt. Morris, Ill.
[73] Assignee: Sperry Rand Corporation, New Holland, Pa.
[21] Appl. No.: 659,602
[22] Filed: Feb. 19, 1976
[51] Int. Cl.² .............................................. A01F 12/18
[52] U.S. Cl. .............................. 130/27 T; 130/27 HA
[58] Field of Search ............. 130/27 T, 27 HA, 27 R, 130/6, 8

[56] References Cited
U.S. PATENT DOCUMENTS

| | | | |
|---|---|---|---|
| 1,651,037 | 11/1927 | Mitchell | 130/6 |
| 3,179,111 | 4/1965 | Morrison et al. | 130/27 T |
| 3,848,609 | 11/1974 | Mortier et al. | 130/27 T |

Primary Examiner—Jay N. Eskovitz
Attorney, Agent, or Firm—Frank A. Seemar; John B. Mitchell; Ralph D'Alessandro

[57] ABSTRACT

A rotor for an axial flow type combine has a generally cylindrical main body portion with a pair of rasp bars mounted longitudinally thereon. The forward portion of each of the rasp bars is inclined outwardly and rearwardly to provide an infeed spacing between the forward portion of the rotor and associated concave which will accommodate abnormal masses of crop material and function to thin out these masses prior to further axial movement of the crop material rearwardly into the threshing and separating region of the rotor.

7 Claims, 4 Drawing Figures

ROTOR FOR A COMBINE

BACKGROUND OF THE INVENTION

The present invention relates to axial flow type harvesting machines and, more particularly, is directed to the structure of the rasp bars on the rotor of the machine.

In axial flow combines, the threshing and separating mechanism extends generally longitudinally (fore-and-aft) to the direction of travel of the combine and generally comprises a rotor rotatably mounted in a casing having a threshing concave and an separating grate. Crop material is fed to the forward or inlet end of the rotor and is then spirally conveyed within the casing as it moves axially rearwardly therethrough whereby the grain is separated from the crop material. There is a relatively small clearance between the rotor and the casing, thus making it difficult to introduce material into the casing. To increase the feeding capacity of the combine, it has been found to be effective to provide an auger means on the forward end of the rotor which aggressively transfers the crop material from the crop elevator to the inlet end of the threshing and separating mechanism. However, it has been found that in certain crop conditions, the auger type infeed tends to bunch or intermittently feed dense quantities of the crop material as it is moved from the crop elevator axially into the threshing compartment.

The bunching of the crop material at the inlet end of the threshing and separating mechanism may cause a multitude of problems. The bunching causes an uneven feeding of crop material to the threshing and separating mechanism which results in an inefficient operation, overloading of the grain-cleaning mechanism and power peak requirements. Further, this bunching of crop material may cause a vibration of the machine structure which is intense and objectionable being characterized by a hammering inside the machine. Also, in extreme cases this bunching of crop material may cause jamming of the rotor and breakdown of the machine which results in costly repairs. Still another disadvantage is the problem of grain crackage which is critical to the price the farmer obtains for his crop.

To summarize, the bunching of abnormal masses of crop material at the inlet of the threshing and separating mechanism often results in an uneven transport of the crop, noisy operation, high peak loads on the drive means, high power requirements, low capacities, costly repairs, etc. These disadvantages are well known to those skilled in the art of the axial flow type harvesting machine. The main object of the present invention is to substantially alleviate these problems.

SUMMARY OF THE INVENTION

According to the present invention there is provided an axial flow type harvesting machine having a generally fore-and-aft extending axial flow type threshing and separating mechanism which includes generally at least one fore-and-aft extending casing means being of generally cylindrical cross section and rotor means within the casing means. The casing means includes a front threshing concave and a rear separating grate that cooperate with a main body portion of the rotor means rotatably mounted in the casing for the threshing and separating the grain from the crop material.

Preferably, the rotor means has a generally cylindrical main body portion with at least one threshing element extending radially outwardly therefrom. The forward portion of the threshing element is sloped or tapers outwardly and rearwardly from the front of the rotor to provide a space between the forward portion of the rotor and the concave for thinning the mat of crop material prior to further spiral rearward movement of the material through the casing.

The present invention provides a smooth flow of crop material through the threshing and separating mechanism whereby the overall power requirement of the machine is reduced. Furthermore, the smooth flow of crop material through the threshing and separating mechanism reduces the likelihood of material jamming and the burden of costly repairs. Still further, with this smooth flow of crop material, a relatively thin and even mat thereof is operated on by the threshing and separating mechanism whereby the effectiveness of the latter is increased with the result that grain loss is decreased without any sacrifice in the power requirement. Also with this present invention, less grain kernels are cracked whereby the quality of the harvested grain is increased considerably.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms as "forward," "rearward," "left," "upwardly," etc., are words of convenience and are not to be construed as limiting terms.

IN GENERAL

Figure 1:
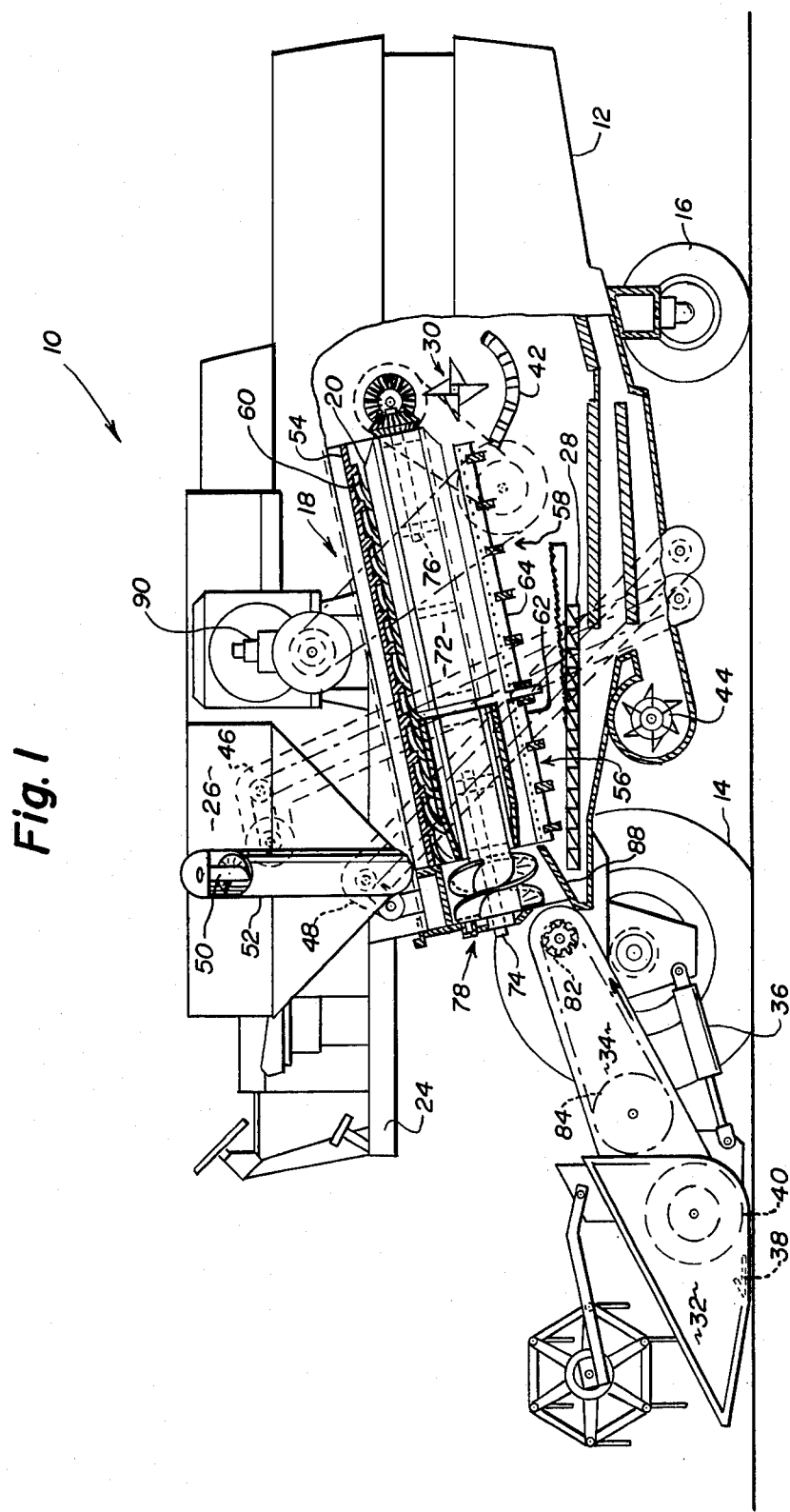
FIG. 1 is a side elevational view, partly in section, of the combine embodying the present invention.

Referring now to the drawings, and particularly to FIG. 1, there is shown an axial flow type combine, being indicated generally by the numeral 10, which incorporates the preferred embodiment of the present invention. While the combine is of the self-propelled type, the improved structure incorporated therein may just as readily be incorporated into a pull-type machine.

The combine comprises a mobile frame or housing means 12 supported on front drive wheels 14 and smaller rear steerable wheels 16 (only the right wheels being shown in FIG. 1). Supported on the main frame 12 is a threshing and separating mechanism 18 in the form of right and left threshing and separating units 20,22 (only the left threshing and separating unit 20 being shown in FIGS. 1 and 2), an operator's platform 24, a grain tank 26, grain handling and cleaning means 28 and a rotary discharge means 30. A conventional header 32 and crop elevator 34 extend forwardly of the machine and the header 32 and elevator 34 are pivotally secured to the frame 12 for general vertical movement which is controlled by extensible hydraulic cylinders 36.

As the combine 10 is propelled forwardly over a field, the crop material which is to be harvested is severed from the stubble by a sickle bar cutter 38 on the header, consolidated laterally by two opposed augers 40 (shown fragmentary in FIG. 1) which feed the cut crop material centrally to the crop elevator 34 which in turns conveys the crop material upwardly and rearwardly to the threshing and separating mechanism 18. The material received by the threshing and separating mechanism 18 will be threshed and separated, that is to say, the crop material (which may be wheat, corn, rice, soybeans, rye, grass seed, barley, oats, corn or other similar crop materials) is rubbed and beaten whereby the grain, seed, etc. is loosened and separated from the straw, stalks, cobs or other discardable part of the crop material. While the term grain and straw are used principally through this application for convenience, it should be understood that the terms are not intended to be limiting. The term grain as used herein thus refers to the part of the crop material that may be threshed and separated from the discardable part of the crop material which will be referred to as straw.

The straw is discharged from the rear of the threshing and separating mechanism 18 onto a discharge plate 42 of the rotary discharge means 30 which finally discharges the straw to the ground. The grain and other material which has been separated from the straw falls onto the grain cleaning and handling means 28 which includes means to separate clean grain and means to separate unthreshed material (known in the art as tailings) from the remainder of the material received in the cleaning means. A rotary fan 44 is provided to blow the chaff out the rear of the machine as the grain falls through the sieves of the cleaning means 28. The cleaned grain is then elevated into the grain tank 26 by an elevator 46 and the tailings are raised by an elevator 48 and delivered to the inlet end of the threshing and separating mechanism 18 where it joins the unthreshed grain being fed into the mechanism from the crop conveyor 34 to repeat the threshing and separating cycle. The cleaned grain is then discharged from the grain tank by an unloading auger 50 which forces the grain through a discharge spout 52.

Figure 4:
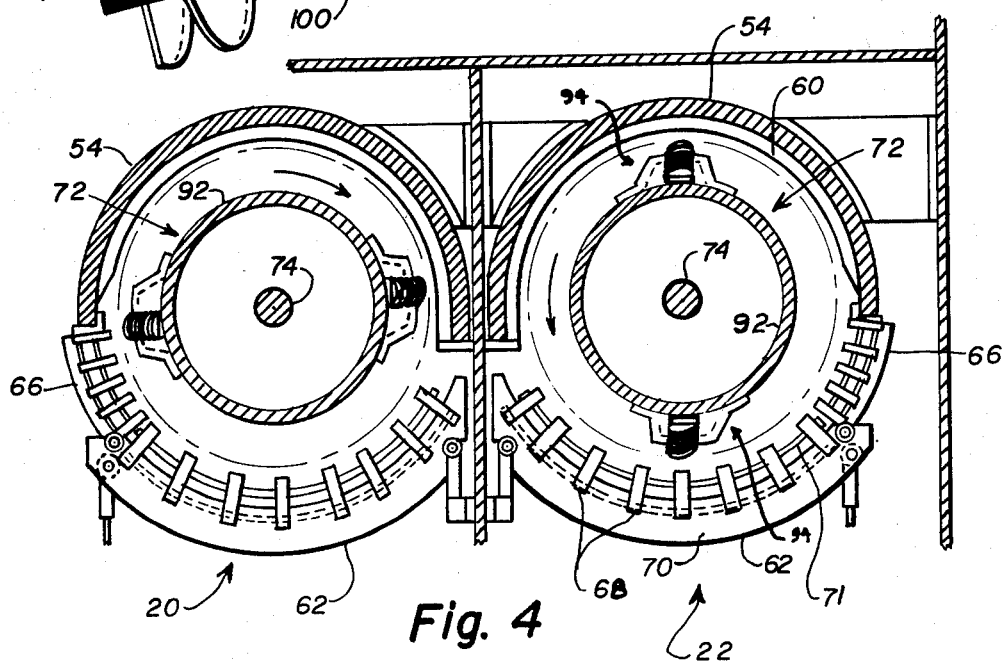
FIG. 4 is an enlarged cross-sectional view taken along line 4—4 of FIG. 2, showing the left and right casings and rotors of the threshing and separating mechanism of the combine.

In the preferred embodiment, the threshing and separating mechanism 18 takes the form of two units 20,22 (FIG. 4) in adjacent side-by-side relation and extending generally longitudinally of the combine. Although, the invention is described and shown in an embodiment having two threshing and separating units, the principles of this invention are equally applicable to a single threshing and separating unit.

The two units 20,22 of the threshing and separating mechanism 18 each have a threshing and separating casing 54 of a generally cylindrical configuration, the units being disposed in a contiguous and parallel side-by-side relation with the parallel axes of the casings 54 lying in a fore-and-aft plane. The units 20,22 are mounted in the combine 10 in an upwardly and rearwardly disposition. The casings 54 are open at their forward ends to receive unthreshed crop material and have rear openings for straw discharge. Each unit 20,22 includes a front threshing section 56 and a rear separating section 58. The top wall of each casing 54 extending longitudinally the entire length of the unit is curved and is provided with conveying means in the form of vanes 60 disposed at an angle to the radial plane which assists in guiding the crop material rearwardly in a generally helical movement along the casings 54. The lower portion of the casings 54 are provided with front threshing concaves 62 and rear separating grates 64. Outer concave extensions 66 (FIG. 4) complete the generally cylindrical casings 54. The concaves 62 are formed by a number of longitudinally-extending bars 68 secured to a number of transverse arcuate supporting beams 70. Cylindrically curved wires 71 extend through the bars 68 to form openings through which grain passes. The separator grates 64 are disposed rearwardly of the concaves 62 and complete the generally cylindrical casings at the location of the separator section. The separator grates 64 are similar to the concaves 62 but the apertures between the bars and wires are considerably larger so as to better suit their specific function of separating the threshed grain.

Housed within the casings 54 are right and left hand longitudinally extending threshing and separating rotors 72 having front and rear stub shafts 74,76 journalled for rotation within suitable bearings mounted on the mobile frame or housing 12. The rotors 72, which will be referred to in detail hereafter, are so arranged such that they rotate in opposite directions downwardly at their adjacent sides, as illustrated by the respective arrows in FIG. 4. Mounted on the forward end of the front stub shaft 74 of each rotor 72 is a feed means 78 which will be discussed later in connection with the discussion of the rotor.

The crop elevator 34, which is attached to the combine frame 12 forwardly of the threshing and separating mechanism 18, transfers the unthreshed crop material from the header 32 to the inlet end of the threshing and separating mechanism 18 and comprises a plurality of endless chains or belts 80 entrained around a rear drive cylinder 82 and a front supporting cylinder 84, shown in phantom in FIG. 1. The upper end of the crop elevator 34 is shown fragmentarily in FIG. 2 and depicts a plurality of cross bars 86 supported between the chains 80. The unthreshed crop material is conveyed in the directions shown by the arrows in FIGS. 1 and 2 to a feed ramp 88 on the inlet end of threshing and separating mechanism 18 under the feed means 78.

The various components of the combine 10 are driven from a conventional internal combustion engine 90 mounted on the mobile frame 12 above the threshing and separating mechanism 18 by suitable drive means generally well known in the art.

IMPROVED ROTOR

Figure 2:
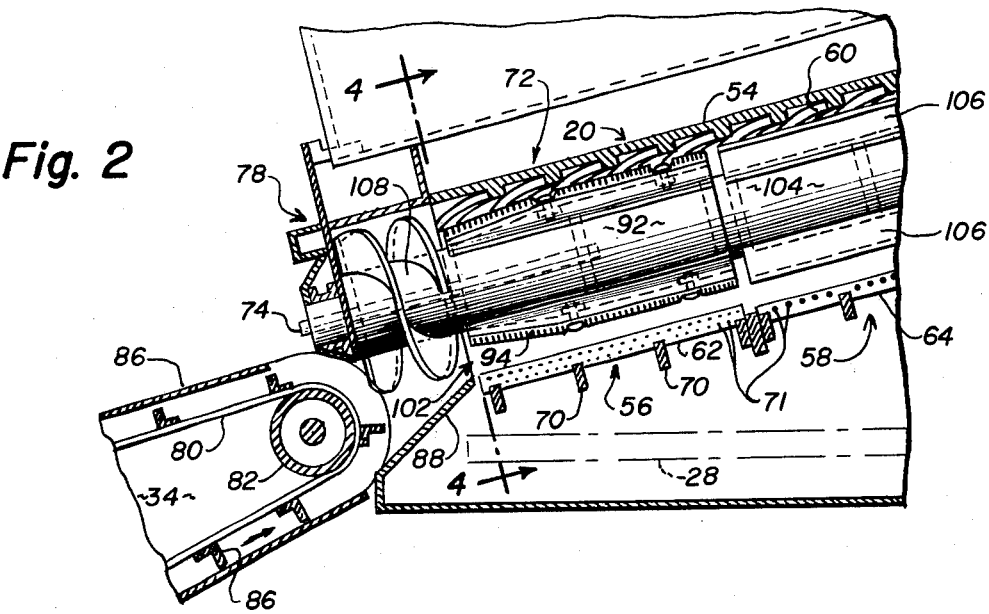
FIG. 2 is an enlarged fragmentary, vertical sectional view of generally the forward half of the left threshing and separating mechanism, and also illustrating the upper end of the elevator of the combine of FIG. 1.
Figure 3:
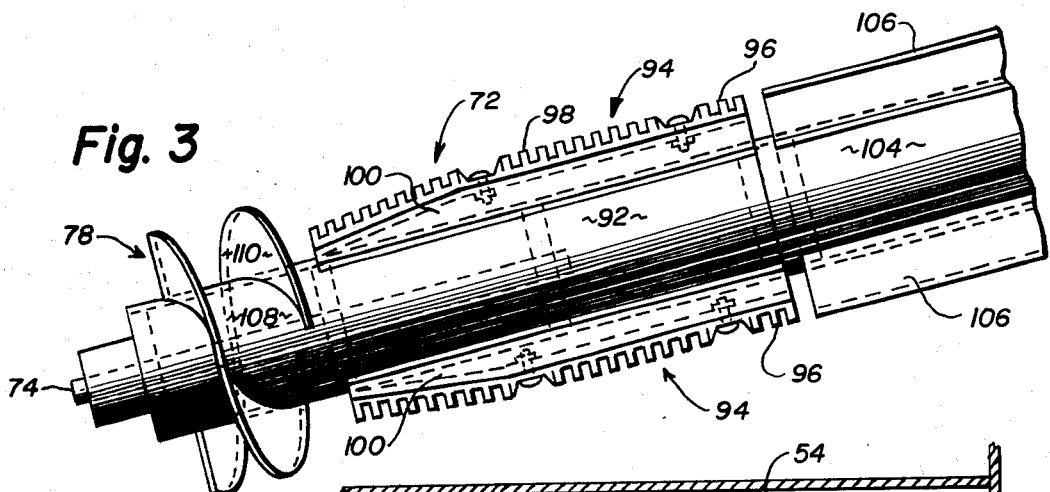
FIG. 3 is an enlarged side elevational view of the forward half of the left rotor illustrated in FIG. 2, but removed from the combine.

As mentioned earlier, the rotors 72 are rotatably and concentrically mounted within the respective casings 54. Conventional drive means are arranged to transmit rotary motion from the engine 90 to both rotors so as to drive the same in opposite directions downwardly at their adjacent sides (see FIG. 4). Each of the rotors 72 are substantially identical except for adaption to rotating in opposite directions and therefore only the details of construction of the left rotor 72, as shown in FIGS. 1, 2 and 3 will be described. Here, it should be again pointed out that although the preferred form of the present invention is incorporated in a combine having two side-by-side threshing and separating units, the invention is equally applicable to a single threshing and separating unit.

The rotor 72 has a front threshing section and a rear separating section and basically comprises a longitudinally extending main body portion 92 having front and rear stub shafts 74,76 mounted within the main body portion 92 and projecting outwardly of respective opposite ends. The main body portion 92 is preferably of a generally cylindrical shape and has a generally constant outside diameter throughout its length. The term "generally cylindrical" as applied to the rotor main body portion 92 is intended to cover a rotor shape approaching cylindrical, such as polygonal.

The threshing section of the rotor 72 preferably comprises two diametrically opposed threshing elements 94 mounted on the peripheral surface of the main body portion 92 and extending longitudinally therealong, generally parallel to the axis of the rotor 72. Each threshing element 94 includes a rasp bar 96 having rasps 98 and being bolted to the top surface of a generally channel-shaped support member 100 with flanged edges which is secured by suitable means to the surface of the main body portion 92 of the rotor 72 such that the rasp bars 96 are spaced from the periphery of the rotor body portion 92. The rasps 98 are inclined or skewed with respect to the longitudinally axes of the rotor 72 in such a manner that they impart a rearwardly directed axial movement to the crop material during operation. Each of the rasp bars 96 have been shown as a one-piece construction; however, they could just as readily be formed of multiple parts.

The forward portion of the threshing elements 94 are inclined outwardly and rearwardly from the main body portion 92 of the rotor 72 to thereby provide a rearwardly-tapering or thinning space 102 (FIG. 2) adjacent the inlet end of the threshing and separating unit 20 between the rotor 72 and the respective threshing concave 56. The purpose of the thinning space 102 will be discussed in more detail further on. The rear portion of the threshing elements 94 is generally parallel to the axis of the rotor 72. The distance between the front end of the threshing element 94 and the front end of the threshing concave 56 is greater than the distance between the rear end of the threshing element 94 and the rear end of the threshing concave 56.

As seen in FIG. 2, the thinning space 102 provides a definite thinning of abnormal bunches or rope-like masses of crop material at the inlet end of the threshing and separating mechanism 18. The crop material is moved substantially in an axial direction by the feed means 78 rearwardly to the forward end of the thinning space 102 where the latter has its maximum height. There, the material is engaged by the rasp bars 96 of the rotor 72 and moved circumferentially with the casing and progressively rearwardly along the forward rasp bar portions which converge toward the casing. Such movement of the abnormal masses effectuates gradual thinning out of the material into a mat having a generally uniform thickness which results in substantial and marked improvement in the operation of the combine 10 by minimizing or eliminating the thumping caused by the masses and reduces or eliminates the damage to the rasp bars 96 and concaves 56. Further, this thinning space 102 allows for a more even and constant layer of crop material to be directed through the casing 56, thereby resulting in less power consumption to operate the threshing and separating mechanism 18 and additionally, in the saving of kernels or grains of crop material from becoming cracked as a result of abnormally large bunches of crop material being fed to the small clearance between the rotor 72 and associated concave 56.

Now, referring again to FIG. 3, the separating section of the rotor 72 includes a generally cylindrical main body portion 104, which in the preferred embodiment is an extension of body portion 92, extending the length of the separating section with preferably two separating elements or blades 106 extending radially outwardly and longitudinally along the main body portion 104. The separating blades 106 are in alignment with the threshing elements 94 and are mounted in a similar fashion such that the outer surface of each separating blade 106 is coplanar with the outer surface of a respective threshing element. As the crop material moves from the threshing section into the separating section, the separating blades 106 sweep the crop material across the separating grates 64 to separate the grain remaining therein. The straw, or discardable material, is then discharged through the rear of the mechanism 18 where it is discharged rearwardly of the combine 10 by the discharge means 30.

Mounted on the front stub shaft 74 of each rotor 72 is a feed means or auger 78 which rotates therewith. The feed means 78 comprises a base portion 108 of generally cylindrical shape conforming to the shape and diameter of the main body portion 92 of the rotor 72 and auger flights or flighting 110 so arranged to feed crop material rearwardly to the inlet end of the threshing and separating mechanism 18 as the rotor 72 is rotated. The auger flighting 110 preferably includes double helical members having a diameter substantially equal to the diameter of the circle described by the rear portion of the threshing elements 94 upon rotation of the rotor 72. Although the feed means 78 has been shown and described in the present embodiment as an auger of a more or less uniform diameter, the feed means 78 could be of the conical auger type wherein the flighting is larger in diameter at its forwardmost portion and progressively decreases in diameter rearwardly toward the threshing section of the rotor 72.

It will be appreciated from the foregoing that the present invention provides a single but highly effective thinning space 102 at the inlet of threshing and separating mechanism 18 where any abnormal masses, bunches or rope-like formations of crop material may be thinned or somewhat smoothed out incident to having the direction of movement thereof abruptly changed from generally axial to substantially circumferential prior to the material being introduced to the more confined major or principal threshing section of the threshing and separating mechanism. Such results in the benefits of savings in power consumption, minimal wear upon the components of the threshing elements, and otherwise in improved threshing operations performed by the combine.

While the invention has been described and illustrated in its several preferred embodiments, it should be understood that the invention is not to be limited to the precise details herein illustrated and described since the same may be carried out in other ways falling within the scope of the invention as illustrated and described.

Having thus described the invention, what is claimed is:

1. In an axial flow type harvesting machine having a generally fore-and-aft extending axial flow type threshing and separating mechanism which includes generally fore-and-aft extending casing means of generally cylindrical cross section, said casing means having a front threshing concave; rotor means which includes a generally cylindrical main body portion having a substantially uniform diameter, said rotor means being rotatably mounted in said casing means and cooperable with said casing means upon rotation for providing flow of crop material through said casing means in a generally spiral path; and feed means in the form of an auger with flighting mounted forwardly of said main body portion of said rotor means; the improvement comprising in combination therewith;

at least one threshing element extending radially outwardly from the surface of the main body portion for cooperating with said casing means to thresh crop material;

said threshing element being positioned rearwardly of said auger and including front and rear portions, said front portion being inclined outwardly and rearwardly from the front end of said rotor means to facilitate the smooth flow of crop material through said mechanism.

2. An axial flow type harvesting machine as set forth in claim 1, wherein the distance between the front end of the threshing element and the front end of said threshing concave is greater than the distance between the rear end of the threshing element and the rear end of said threshing concave.

3. An axial flow type harvesting machine as set forth in claim 1, wherein the rear portion of said threshing element is generally parallel to the axis of said rotor means.

4. An axial flow type harvesting machine as set forth in claim 1, wherein said threshing element comprises a rasp bar and a support member, said support member having a top wall spaced from the periphery of said main body portion of said rotor means, said rasp bar being mounted on said top wall.

5. In an axial flow type harvesting machine, the combination comprising:
 (a) generally fore-and-aft extending casing means of generally cylindrical cross section, having an infeed front end arranged to receive a mat of crop material in a substantially axial direction, said casing means including a front threshing concave;
 (b) rotor means rotatably mounted in said casing means and cooperable with said casing means upon rotation for providing flow of crop material through said casing means in a generally spiral path, said rotor means including a generally cylindrical main body portion;
 (c) feed means in the form of auger flighting mounted forward of the infeed front end of said casing means for rotation with said rotor means;
 (d) crop elevator means mounted on said machine forwardly of said feed means for conveying a mat of crop material upwardly and rearwardly to said feed means, said feed means being operable to feed the mat to the infeed front end of said casing means; and
 (e) a plurality of threshing elements spaced rearwardly and extending radially outwardly from the surface of said main body portion of said rotor means in an axial direction therealong, the forward portion of said threshing elements being sloped outwardly from said main body portion toward the rear thereof, thereby providing a space adjacent said infeed front end of said casing means in which abnormally large masses of crop material may be accommodated and worked into a generally uniform mat prior to further axial movement thereof through said casing means.

6. An axial flow type harvesting machine as set forth in claim 5 wherein the diameter of the circle described by the auger flighting adjacent the main body portion of said rotor means is substantially equal to the diameter of the circle described by the rear end portion of said threshing elements during rotation of said rotor means.

7. An axial flow type harvesting machine as set forth in claim 5 wherein the diameter of the circle described by the auger flighting adjacent the threshing elements during rotation of said rotor means is greater than the diameter of the circle described by the forward end of said threshing elements.

* * * * *